May 1, 1928.
J. F. SMITH
1,668,089
VALVE STEM LUBRICATOR
Filed Feb. 21, 1927
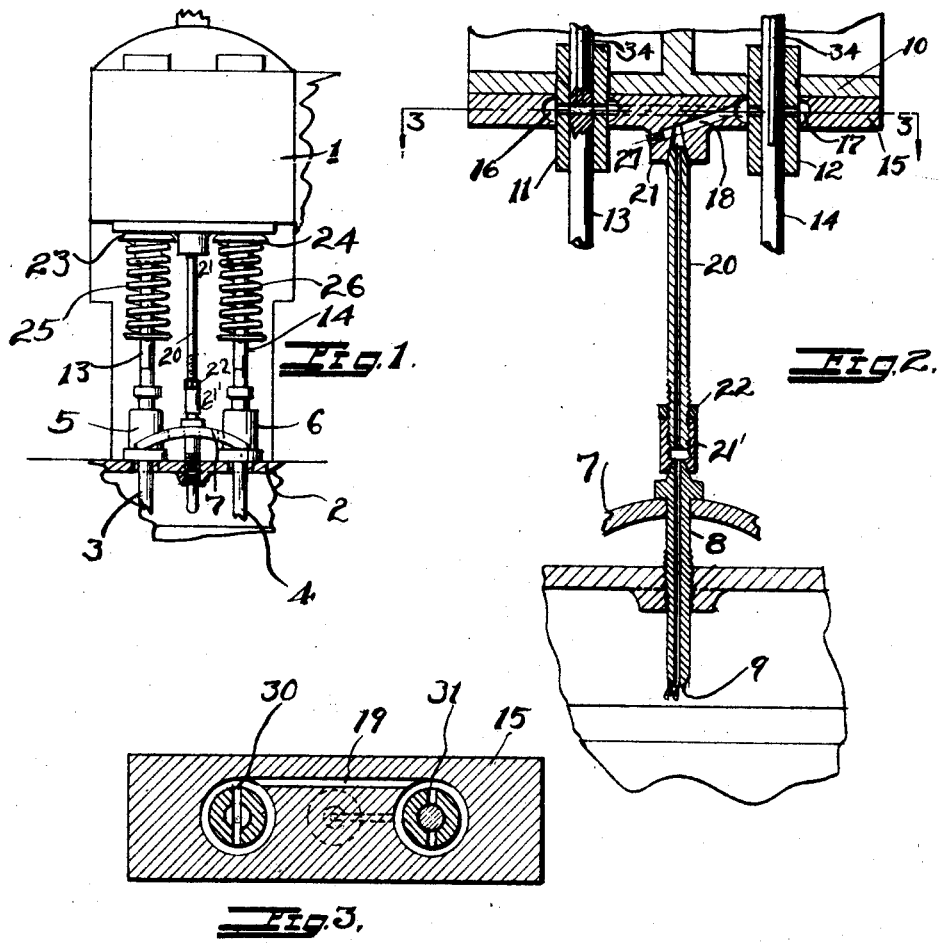
INVENTOR.
John F. Smith.
BY
Carlos P. Griffin
ATTORNEY.

Patented May 1, 1928.

1,668,089

UNITED STATES PATENT OFFICE.

JOHN F. SMITH, OF SAN FRANCISCO, CALIFORNIA.

VALVE-STEM LUBRICATOR.

Application filed February 21, 1927. Serial No. 169,738.

This invention relates to means for lubricating the bearings for the valve stems of explosion engines immediately under the valve.

It will be understood by those skilled in the art that it is quite difficult to lubricate the bearings for the stems of explosion engine valves in the bearings immediately under the valve proper, with the result that the stems are frequently heated, burned, or worn in such a way as to cause them to stick frequently. Also because of the fact that immediately adjacent every hot stem there is a cooler stem, one valve being the exhaust valve and the other being the inlet valve, there is also more or less expansion which of itself tends to cause the valve to wear and act badly in various ways.

This invention is intended to provide means for lubricating such bearings and valve stems, which means can be easily applied to ordinary engines now in use, or which may be equally well attached to any engines using the type of valves to which this lubricating device is applicable.

Another object of the invention is to provide a lubricating device which will be entirely automatic, and which will be so arranged that it will not at any time be over loaded with oil.

Other objects of the invention will be apparent as the description proceeds.

An embodiment of the invention is shown in the accompanying drawings in which the same reference numeral is applied to the same portion throughout the several figures of the drawings and of which there may be modifications.

Figure 1 is a side elevation of a portion of an engine showing one cylinder with its inlet and outlet valve.

Figure 2 is a detail view in section of this lubricating device as it is applied to the engine.

Figure 3 is a horizontal view in section of the lubricating plate.

The numeral 1 indicates the outside of one of the cylinders of a vertical explosion engine. 2 represents the top of the engine base through which the pusher rods 3 and 4 pass. The pusher rods are slidable in two vertical bearings 5 and 6 which are held in place by means of a flat curved yoke 7. Ordinarily this flat curved yoke is held in place by means of a bolt which is screwed into the top of the engine case, but in the present instance this bolt is taken out and a tubular bolt 8 is used instead. This tubular bolt is somewhat longer than the usual bolt, and its lower portion projects into the engine base far enough to enable it to collect some of the fog of oil which is always present during the time the engine is running, and this fog of oil forms a drop on the bottom of the tubular bolt as indicated at 9 from time to time.

The lower wall of the inlet and exhaust compartments of the engine cylinder is indicated at 10, said wall having two bosses 11 and 12 which form the bearings for the valve stems 13 and 14.

In order to provide means for drawing the oil through the tubular bolt 8 and lubricating each of these two valve stems a plate 15 is used. This plate has two holes therein which fit snugly around the two bosses 11 and 12, and these holes are each reamed out with a circumferentially extending groove as indicated at 16 and 17, the object being to provide a channel for the oil to pass to both of the valve stem bearings. This plate also has a channel bored therein as indicated at 18, and another duct as indicated at 19 which allows the vacuum within the inlet chamber to act upon the tubular member 20 to draw the oil that may be collected at the bottom of the tubular bolt 8 up into the valve stem bearings. This plate 17 has a depending boss 21, and it is held in place particularly by the tubular rod 20 with the socket 21' at the lower end, and which socket is held in the position shown in Figure 2 by the lock nut 22, and by the cups 23 and 24 which form the upper bearings for the valve springs 25—26. A small screw 27 is used to close the end of the channel 18 where it starts in the boss 21.

Since it is contemplated that this apparatus is to be installed on engines already in use as well as those to which it may be specially applied in the beginning the two bosses 11 and 12 are provided with holes 30 and 31 one of which passes through its corresponding valve stem as shown in Figure 3 and as shown in Figure 2, in which latter the holes are turned ninety degrees from their proper position, which proper position is shown in Figure 3, for purpose of illustration, and in order to allow the vacuum to be applied to the channels in the plate and to the tubular bolt 8 and rod 20. The inlet valve stem has a groove 34 cut in it of sufficient length to pass above the top of the boss 11. The result of this is that every time the hole through the valve stem registers with the two holes through the bearing 11 that the drop of oil 9 at the bottom of the bolt 8 will be sucked up into the passageway.

By this arrangement, it will be evident that a predetermined suction action will be established before the holes 30 and 31 come into register with the radial openings in the valve stem bearings. This will insure that substantially equal and measured quantities of oil will be drawn into the bearings at a predetermined point in the movement of the valve stems, with the result that the amount of oil will be conserved and that it will be drawn into the bearing at a point and in sufficient quantity to properly lubricate the bearing and stem. As the valve stems are rotating continuously this will occur often enough to supply oil to both of the bearing bosses 11 and 12 and will prevent them from sticking at any time.

If the lower bearings for the valve pusher stems are not removable from the engine it will be necessary to bore a hole in the engine case between them to correspond with the holes used under the clamp 7.

In operation of the present invention, the tubular bolt is threaded through the opening in the upper wall of the crankcase 2 and is adjusted so that its lower end will penetrate into the crankcase a predetermined distance. It will be understood that the depth of penetration will determine the quantity of oil which is thereafter delivered to the valve stem bearings. This tubular bolt passes through the yoke 7 by which the lower bearings 5 and 6 of the valve tappets are held in position.

The tubular rod 20 is then disposed above the tubular bolt 8 and is positioned with its upper tapered end seated within a tapered opening 21' of the plate 15. The lower end of the tubular rod is engaged by the socket or threaded sleeve 21' which in turn seats over the upwardly projecting tapered end of the tubular bolt. It will thus be understood that by adjusting the threaded sleeve 21 the tubular bolt and tubular rod may be moved toward and away from each other along a common longitudinal axis and that by this means the tapered joints may be caused to fit tightly and the rod will act to hold the plate 15 in a secure position against the under face of the valve housing 10.

The valve plate 15 carries the bosses or bushings 11 and 12 through which the valve stems 13 and 14 reciprocate and since these bushings have been formed with radial openings 30 and 31 which register with distributing ducts 16 and 17 respectively, the device is now in condition for operation.

It will be assumed that the valve stem 13 actuates the intake valve of the engine and that the valve stem 14 actuates the exhaust valve. When the valve stem 13 is in its uppermost position the cylinder will be taking in gas and its piston will be on its suction stroke. This will cause suction to be exerted down along the duct 34 formed between the valve stem 13 and the bushing 11 and communicating with the radial passageways 30 in the bushing 11. This will cause suction to be exerted upon the circumferentially extending duct 16 which circumscribes the bushing 11 and then upon the communicating duct 19 leading to the duct 17 which circumscribes the bushing 12, and since this duct is in communication with the duct 18 leading to the tubular rod 20 it will be understood that oil will be drawn upwardly through the tubular bolt 8 and the tubular rod 20 along the duct 18 and thence around the annular passageway 17, during which time oil will be drawn into the radial ducts 31 in the bushing 12 and will be thus distributed to the surface of the valve stem 14. At the same time oil will be carried along duct 19 to the circumscribing duct 16 of bushing 11 and will be distributed through the radial ducts 30 to the surface of the valve stem 13. It will be evident that as the two stems reciprocate, oil will be applied to their bearing surfaces and that in this manner lubrication will be effected.

It also follows that a certain amount of oil will be drawn upwardly along the valve stems and will particularly be drawn into the cylinder in small quantities with the gas charge. This has its advantage in moistening the carbon deposit at the upper end of the cylinder and in lubricating the upper end of the piston which as a rule does not receive lubrication.

It will thus be seen that by the use of the device here disclosed carbon deposits may be rendered soft and easily burnable. The upper ends of the pistons may be lubricated and at the same time the valve stems will be adequately lubricated so that they will not become pitted or scored and will not become covered with a gummy deposit, which will tend to cause them to stick or to be sluggish in their operation.

While I have shown the preferred form of my invention, it is to be understood that various changes may be made in its construction by those skilled in the art without departing from the spirit of the invention, as defined in the appended claims.

Having thus described my invention, what I desire to secure by Letters Patent of the United States is as follows, but modifications may be made in carrying out the invention as shown in the drawing and in the above particularly described form thereof, within the purview of the annexed claims.

1. A lubricating device for valve stem bearings comprising a plate adapted to be placed on the bearings to be lubricated, a tube extending from a point inside the engine base to said plate, said plate having means whereby the vacuum in the inlet manifold will draw oil to the exhaust stem bearing and then to the inlet stem bearing.

2. In a lubricating device for the valve stems of explosion engines comprising a plate having openings therein to pass over the valve stem bearing bosses, said plate having openings whereby the lubricant will be drawn first to the exhaust stem bearing, and then to the inlet stem bearing, a tubular bolt for holding the lower pusher rod bearings in place and having a portion thereof depending into the engine base, and a second tubular bolt for completing the passageway from the interior of the engine casing to the lubricating plate surrounding the valve stem bearing bosses.

3. A lubricating device for the valve stems of explosion engines comprising the combination with the bearing bosses of said engine of a plate adapted to surround and tightly fit two of said bosses, said bosses having holes therethrough to permit the lubricant to have access to the valve stem, and means extending into the engine base to collect a small quantity of oil and allow the same to be transmitted to the exhaust valve stem and then to the inlet valve stem.

4. A lubricating device for the bearing bosses of explosion engine valve stems comprising a plate adapted to tightly fit two of said bearing bosses, means whereby the vacuum within the inlet manifold may be applied to openings in said plate to deliver lubricant first to the exhaust valve stem and to the inlet valve stem, and extensible tubular means for transmitting lubricant thereto, a portion of said means extending into the engine base to receive the lubricant.

5. In combination with an internal combustion engine having a crank shaft and reciprocating valve stems extending through bearings, a conduit leading from the crank shaft to said bearings, and means controlled by the valve stems whereby suction will be exerted upon the conduit at points in the travel of the stems to permit oil to be drawn from the crank case to the valve stem bearings for lubrication thereof.

6. In combination with a crank case and valve housing of an internal combustion engine, a distributing plate disposed against the valve housing, bushings extending therethrough, valve stems reciprocating through said bushings, a conduit projecting into the crank case and bearing against the plate whereby communication is established between the crank case and the distributing ducts of the plate and the plate is held in position.

7. In combination with the crank case of an internal combustion engine, a valve stem and a bearing within which said valve stem reciprocates, an unrestricted conduit leading from a point within the crank case to the bore of the bearing, and a longitudinally extending duct formed on the outer surface of the valve stem and whereby suction of the engine cylinder with which the valve stem is associated will tend to draw oil upwardly from the crank case through the conduit and into the bearing for the lubrication thereof.

8. In combination with the crank case of an internal combustion engine, a valve stem and a bearing within which said valve stem reciprocates, an unrestricted conduit leading from a point within the crank case to the bore of the bearing, and a longitudinally extending duct formed on the outer surface of the valve stem and whereby suction of the engine cylinder with which the valve stem is associated will tend to draw oil upwardly from the crank case through the conduit and into the bearing for the lubrication thereof at a predetermined point in the travel of the valve stem.

9. In combination with the crank case of an internal combustion engine, an intake valve stem and a bearing through which said valve stem reciprocates, a suction conduit leading from the bearing to a point within the crank case, a suction duct extending longitudinally of the outer surface of the valve stem from a point above the bearing to a predetermined point along the length of the stem whereby said duct may register with the suction opening in the bearing at a predetermined point in the travel of the stem to cause oil to be drawn upwardly from the crank case through the suction conduit to the bearing.

10. In combination with the crank case of an internal combustion engine, an intake valve stem and an exhaust valve stem, bearings for each stem and through which they reciprocate, an oil duct for each of said bearings, a suction conduit connecting the oil duct of the exhaust bearing with the crank case of the engine, a passageway connecting the oil duct of the exhaust bearing with the oil duct of the intake bearing, and whereby suction existing around the valve stem within the intake bearing will act to lift oil from the crank case through the suction conduit to the exhaust bearing and thence to the intake bearing to afford lubrication for both valve stems.

11. In combination with the crank case of an internal combustion engine, a valve stem and a bearing therefor, a suction conduit leading from the bearing to the crank case of the engine, and adjustable means in communication with said conduit and extending into the crank case whereby the variable volumes of oil may be delivered through the conduit to the bearing of the stem due to suction of the engine acting around the stem within the bearing and through the conduit.

In testimony whereof I have hereunto set my hand this 7th day of February, A. D. 1927.

JOHN F. SMITH.